United States Patent [19]

Fleche

[11] Patent Number: 4,821,968

[45] Date of Patent: Apr. 18, 1989

[54] HOPPER FOR INSERTING FOODSTUFFS INTO A FOOD PROCESSOR

[75] Inventor: Michel Fleche, Blanzy, France

[73] Assignee: Robot Coupe S.A., Montceau Les Mines, France

[21] Appl. No.: 65,484

[22] Filed: Jun. 23, 1987

[30] Foreign Application Priority Data

Jul. 16, 1986 [FR] France .................... 86 10323

[51] Int. Cl.⁴ .................................... B02C 25/00
[52] U.S. Cl. ........................................ 241/37.5; 241/92
[58] Field of Search ............... 241/37.5, 92, 282.1, 241/282.2, 273.1, 273.2, 273.3, 273.4

[56] References Cited

U.S. PATENT DOCUMENTS

| | | | |
|---|---|---|---|
| 185,184 | 12/1876 | Market et al. | 241/273.2 X |
| 2,208,335 | 7/1940 | Kurtz | 241/273.3 X |
| 4,371,118 | 2/1983 | Sontheimer et al. | 241/37.5 |
| 4,523,720 | 6/1985 | Behringer et al. | |
| 4,614,306 | 9/1986 | Doggett | 241/37.5 |
| 4,629,131 | 12/1986 | Podell | 241/37.5 X |

FOREIGN PATENT DOCUMENTS

| | | |
|---|---|---|
| 84745 | 8/1983 | European Pat. Off. |
| 2542084 | 3/1977 | Fed. Rep. of Germany |
| 2403771 | 4/1979 | France |
| 4089 | 1/1975 | Japan .................... 241/37.5 |
| 701674 | 12/1953 | United Kingdom |

*Primary Examiner*—Mark Rosenbaum
*Attorney, Agent, or Firm*—Thomas A. O'Rourke

[57] ABSTRACT

A hopper for inserting foodstuffs into a food processor apparatus comprising a base which includes an electric motor whose shaft projects through the surface of the base, a bowl (2) removably mounted on said base, and a cover (1) capable of being locked onto the bowl (2), the cover having an opening surrounded by a chute (3), and a pusher (8) capable of being inserted into the chute (3) in order to press against food, the hopper being characterized in that a pusher support (5) is pivotally mounted at the top of the chute (3), said support slidably receiving a pusher rod (8) terminated by a blade (9) whose section is substantially equal to the inside section of the chute (3).

5 Claims, 3 Drawing Sheets

HOPPER FOR INSERTING FOODSTUFFS INTO A FOOD PROCESSOR

The present invention relates to a hopper for inserting foodstuffs into a food processor, and particularly, but not exclusively, to an apparatus of the vegetable cutter type.

BACKGROUND OF THE INVENTION

In such apparatuses, vegetables are cut by means of disks rotating at high speed in the top of a bowl or receptacle, with the disks being capable of carrying various knives or cutting shapes. Under such conditions, in order to avoid accidents, it is essential to prevent contact between the disk and a finger of the user. In order to obtain this result, various regulations have defined a minimum height and a maximum diameter for a hopper or chute for inserting food to be cut. Unfortunately, these dimensions which are intended to prevent a hand from moving inside the chute also limit the use of such apparatuses to vegetables or other produce of relatively small cross-section. It then becomes necessary to cut up some foodstuffs prior to processing, thereby reducing the effectiveness of such apparatuses.

Proposals have already been made to provide such apparatuses with insertion means enabling them to be fed with vegetables or produce of relatively large size, e.g. cabbages or potatoes.

European patent publication EP-A-82 402004 describes a device for inserting large-sized food items into a food processor apparatus of the type comprising a base, a drive shaft projecting from the base to receive a blade-carrying cutter tool on a hub, with a motor being provided inside the base to rotate the drive shaft, and with the bowl being removably mounted on the base and surrounding the drive shaft. The device described in said patent comprises a tubular hopper whose diameter is substantially equal to the diameter of the bowl, with a partition projecting radially towards the center of the hopper, said partition being terminated by a central projection which extends over and covers the innermost edge of the blade, with the inside surface of the hopper covering the outermost edge of the blade when the tool is mounted on the hub. The purpose of the radial wall is to hold the produce to be cut, since if the wall was absent, the produce would rotate. The disk carrying at least one cutting tool serves to separate the feed hopper from the bowl for receiving the cut produce. Also, in order to ensure that cutting takes place normally, it is necessary to apply pressure on the produce to be cut. This pressure can be applied by means of a pusher whose cross-section is substantially equal to the cross-section of the hopper. Safety is ensured in EP-A-82 402004 by the presence of a pusher in the chute.

In U.S. Pat. No. 4,216,917 an adaptor slides around the chute and is used in co-operation with a captive pusher. In this embodiment, the motor ON/OFF switch is controlled by a member fixed to the adaptor and is switched on only when the cover is in place and locked onto the bowl with the adaptor mounted around the chute.

Another solution described in French patent document FR-A-2 403 771 is used in professional equipment. It consists in using a tall cylindrical hopper mounted over the bowl, with the inside wall of the hopper having vertical slots for receiving at least one radial partition extending at least as far as the immediate proximity of the center of the hopper. The hopper pusher has slots to allow the pusher to pass in the sectors between the partitions. The pusher is actuated by a piston and cooperates with a switch which enables the motor to be switched on only when the pusher is in such a position as to close a sector of not less than 180° C. of the inlet area to the hopper. Although this allows large-sized foodstuffs to be processed, it also requires a specially adapted blade and a plurality of partitions, and the results both at the center and round the edges of the hopper are not satisfactory.

Other hoppers enabling relatively large-sized foodstuffs to be inserted are described in the following patent documents U.S. Pat. No. 2,414,075, DE-A-2 542 084, U.S. Pat. No. 2,796,103 and GB-B-701 674. None of these hoppers gives full satisfaction for a professional vegetable cutter.

SUMMARY OF THE INVENTION

The present invention provides an insertion hopper for loading foodstuffs even of large size into a food processor apparatus having an electric motor, said hopper ensuring full safety for the user. According to the present invention, the insertion hopper for a food processor apparatus comprises a chute mounted on a cover and surrounding an insertion orifice formed in the cover, together with a pusher for applying pressure on foodstuffs, with motor operation being enabled solely when the pusher is inserted in the chute, and a pusher support is pivoted to the top portion of the chute with a pusher rod being slidably mounted in the pusher support and being terminated by a blade whose section is substantially equal to the inside section of the chute.

Preferably, a magnet is mounted in the pusher support so as to come opposite a magnetic bar extending substantially parallel to the axis of the chute and carried by the cover, the bottom end of said magnetic bar coming opposite a magnetically controlled switch when the cover is mounted on the bowl, said switch being connected in series in the motor power supply circuit.

Thus, motor switch-on is enabled by the pusher being inserted into the chute, and the presence of the pusher prevents a hand or even a finger from passing along the chute and coming into contact with a cutting tool, the control magnet coming into alignment with the rod and the magnetically controlled switch solely when the cover is in place and the pusher is in its working position.

BRIEF DESCRIPTION OF THE DRAWINGS

An embodiment of the invention is described by way of example with reference to the accompanying drawings, in which.

MORE DETAILED DESCRIPTION

Figure 1:
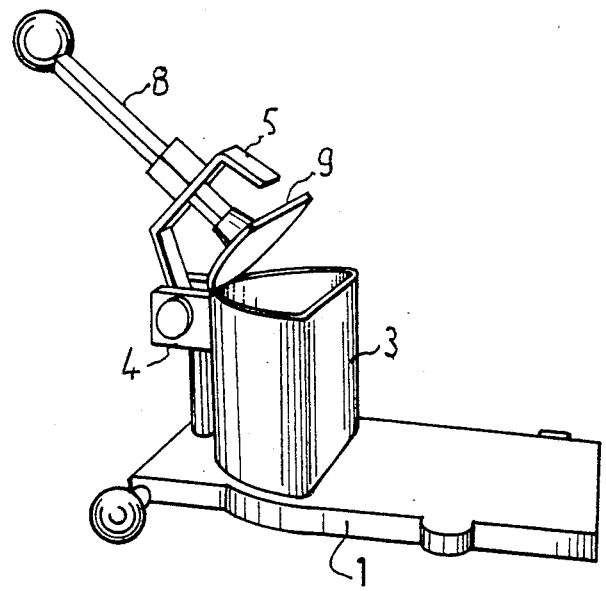
FIG. 1 is a perspective view of the cover, the chute, and the pusher.

In the figures the same references designate the same items, and they show a cover 1 capable of being removably fixed or articulated on a bowl 2. A generally semi-cylindrical chute 3 projects upwardly from the top surface of the cover 1, and the section of the chute is advantageously semicircular in shape. A clevis 4 projects outwardly from the top of the chute and has a pusher support 5 pivoted therein. A duct 6 extends below the clevis 4 substantially perpendicularly to the surface of the cover 1, and a magnetic bar 7 is mounted inside the duct. A pusher rod 8 is slidably mounted in the pusher support 5 and the bottom end of the rod is terminated by a blade 9 of slightly smaller section than the cross-section of the chute 3.

Figure 3:
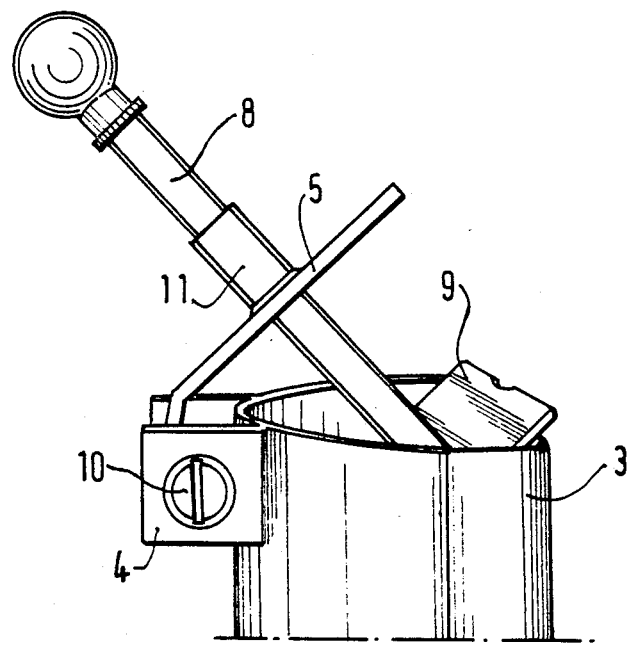
FIG. 3 is a view for showing that it is impossible to close the chute and thus enable the motor so long as the pusher is not in its raised position.

As can be seen in FIG. 3, the blade 9 cannot enter the chute 3 when it is in a low position inside the pusher support 5. Given that the length of the pusher rod is substantially equal to the height of the chute and given the pivoting about the axis 10, the blade 9 can only be engaged in the chute once it has been raised to its high position. The pusher support includes a guide-forming portion 11 intended to allow axial displacement of the pusher, and a bearing surface 12 at its end furthest from the pivot axis 10 for bearing against the side of the chute furthest from the pivot axis. In order to apply considerable pressure using the pusher rod, it is necessary for the pusher support to stand on fixed support points which are respectively the pivot axis 10 and the bearing surface 12. The pusher rod 8 is guided by a collar 11 so that the edges of the blade 9 do not rub against the inside wall of the chute 3, which would give rise to friction which could spoil the results obtained.

In FIG. 1, the hopper is in its open position, i.e. the support 5 has pivoted after the pusher rod 8 has been raised inside the guide collar 11, i.e. after the blade 9 has been raised to its high position. Under such conditions, the support 5 is free to pivot about its pivot axis 10.

Figure 2:
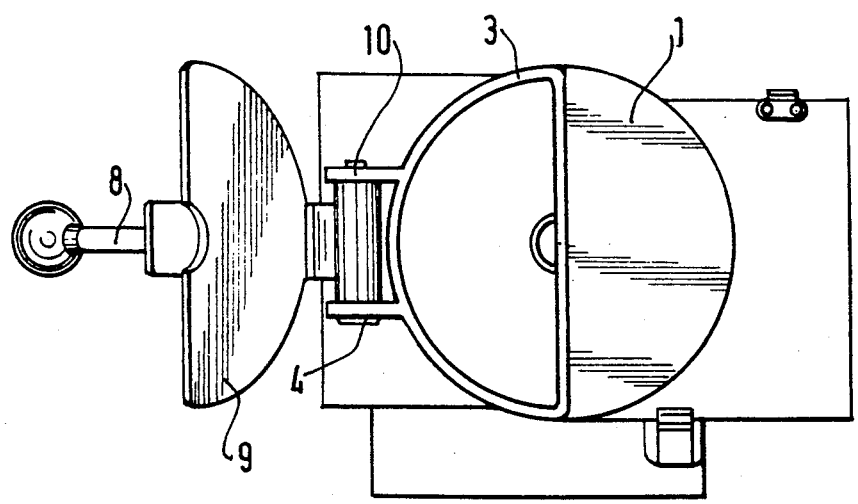
FIG. 2 is a plan view of the same assembly in the open position.

As can be seen more clearly in FIG. 2, a full pivoting movement completely disengages the hopper 3 and large-sized vegetables, or more generally foodstuffs, may be inserted therein. As can be seen in FIG. 2, the chute 3 has a substantially semicircular section with rounded corners to avoid matter accumulating therein. The semicircular shape is practically the same as the area swept by the cutting tool, which area should avoid the outermost edge of the tool since in practice it cannot have a cutting surface, and also the central portion thereof since the tangential speed of the cutting tool is then zero or nearly zero. Thus, the shape adopted gives rise to an optimal working area.

After the chute has been filled, the pusher support is titled about the axis 10 in the opposite direction to before. As can be clearly seen in FIG. 3, the pusher, and more precisely its blade 9, cannot enter into the chute 3 unless the pusher rod 8 is in its high position. Naturally, the stroke of the rod 8 through the guide collar 11 is equal to the height of the chute or is slightly less than said height.

Figure 4:
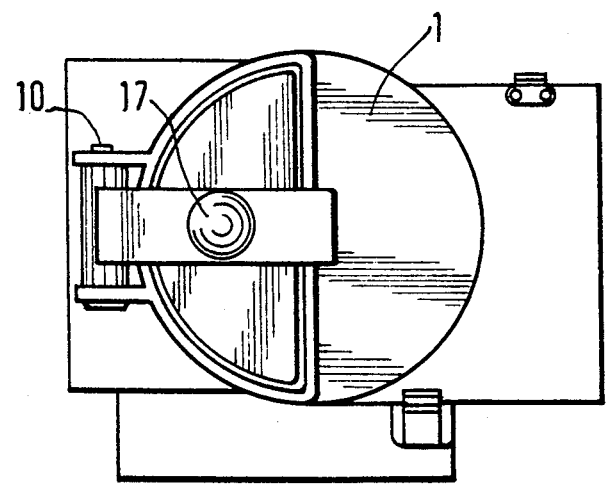
FIG. 4 is a view of the chute in the working position.

After operation, these various members occupy the position shown in FIG. 4, with the pusher rod having its ball handle 17 coming into abutment against the top of the guide collar 11 so that there is no danger of the blade 9 coming into contact with the cutting tool (not shown). Naturally, during a cutting operation, the material to be cut is prevented from rotating by being retained by the sides of the chute.

Figure 5:
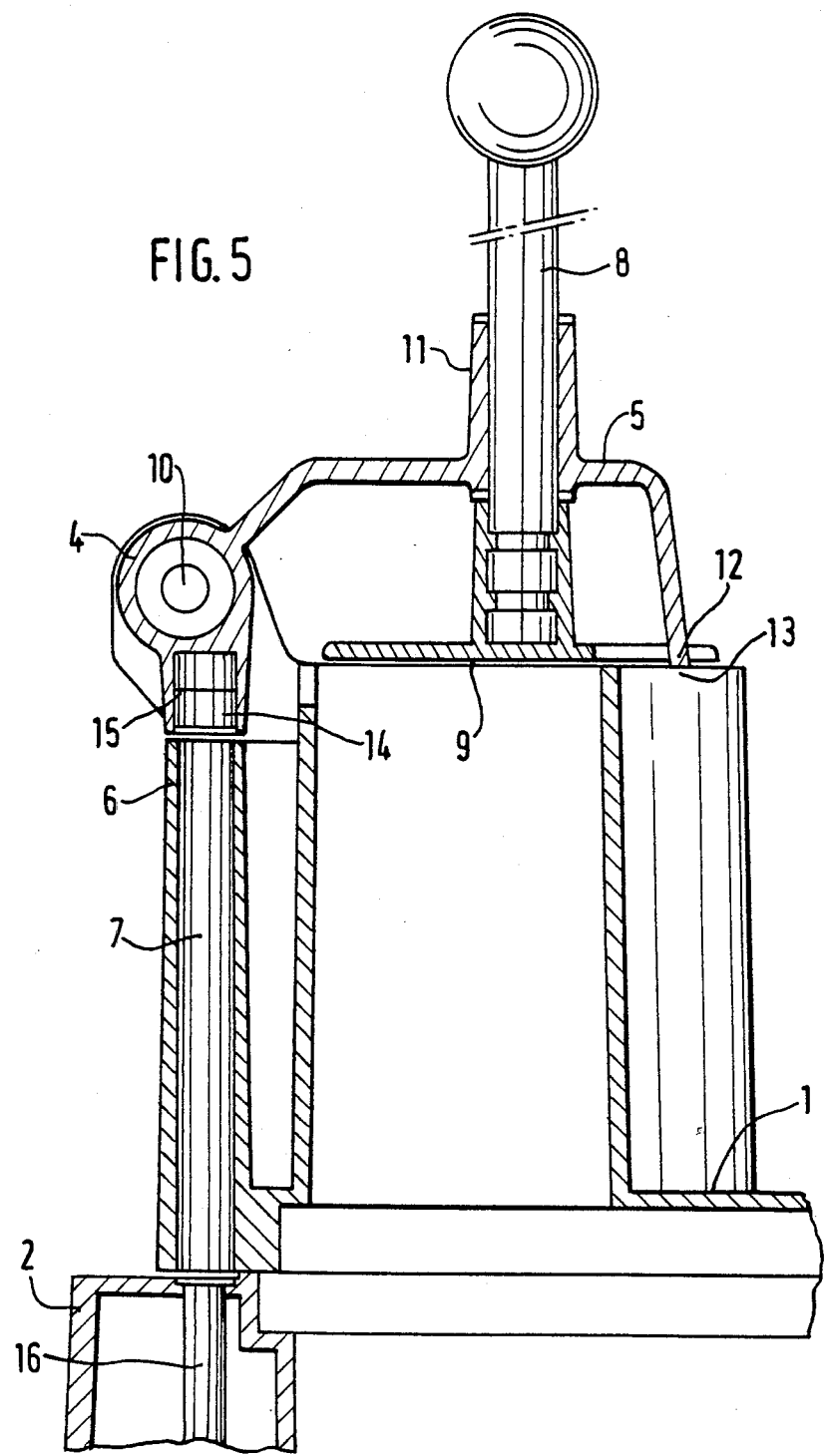
FIG. 5 is a vertical section showing how the magnet is mounted to provide the magnetic safety operating feature.

FIG. 5 is a section through an insertion hopper in accordance with the invention. A magnet 14 is mounted by means of glue inside a cavity 15 provided in the bottom portion of the pusher support 5 substantially vertically beneath the pivot axis 10. When the support 5 has its edge 12 bearing against the top portion 13 of the chute, the magnet 14 comes opposite a magnetic bar 7 and induces a magnetic field therein, which magnetic field re-appears at the bottom end of the bar 7 in order to actuate a magnetically controlled switch 16, for example a switch of the ILS type. The switch 16 then closes the power supply circuit of the motor, and the motor may then be switched on using a user-operated switch (not shown).

When operation is over, the pusher 8 is raised upwardly along the chute and the pusher support 5 can pivot about its axis. As it pivots, the magnet 14 is tilted away from the bar 7 and a magnetic field is no longer induced therein. As a result, the magnetic switch 16 opens and the motor can no longer be switched on, thereby providing the desired safety feature. Similarly, the motor cannot be switched when the cover is not in place since then there is no magnet acting on the magnetic switch 16. Naturally, this magnetic safety device is coupled with means for locking the cover on the bowl, so that contact can only be established when the cover is in a determined position relative to the bowl 2.

Naturally, numerous variants can be used, in particular by substitution of technically equivalent means, without thereby going beyond the scope of the invention.

I claim:

1. A hopper for inserting foodstuffs into a food processor apparatus comprising a base which includes an electric motor whose shaft projects through the surface of the base, a bowl removably mounted on said base, and a cover capable of being locked onto the bowl, the cover having an opening surrounded by a chute, and a pusher capable of being inserted into the chute in order to press against food, the hopper including the improvement whereby a pusher support is pivotally mounted at the top of the chute, said support slidably receiving a pusher rod and said pusher rod being terminated by a blade whose section is substantially equal to the inside section of the chute, said blade being capable of being engaged in said chute such that the edges of said blade are completely within said chute only when said pusher rod is in a raised position and said hopper having a means such that said motor is capable of operating only when said pusher support is in a lowered position.

2. A hopper according to claim 1, wherein a magnet is mounted in the pusher support in such a manner as to come opposite a magnetic bar extending in a position substantially parallel to the axis of the chute, the bar included in a housing extending up to the top surface of the cover, and the bottom end of the magnetic bar coming opposite a magnetically controlled switch when the cover is mounted on the bowl.

3. A hopper according to claim 1, wherein the pusher support is pivoted in a clevis about an axis and has a bearing surface for pressing against the top surface of the chute.

4. A hopper according to claim 1, wherein the pusher support has a guide collar through which the pusher rod is mounted to slide over a stroke which is substantially equal to the height of the chute.

5. A hopper according to claim 1, wherein the chute has a semicircular cross-section with rounded corners which covers substantially one-half of the area of the bowl while avoiding its periphery and its central portion.

* * * * *